United States Patent
Huber et al.

(10) Patent No.: US 7,495,996 B2
(45) Date of Patent: Feb. 24, 2009

(54) METHOD FOR IMPROVED SONAR VELOCITY PROCESSING

(75) Inventors: James G. Huber, North Babylon, NY (US); Anthony L. Scoca, Hicksville, NY (US)

(73) Assignee: Lockheed Martin Corporation, Bethesda, MD (US)

(*) Notice: Subject to any disclaimer, the term of this patent is extended or adjusted under 35 U.S.C. 154(b) by 160 days.

(21) Appl. No.: 11/381,395

(22) Filed: May 3, 2006

(65) Prior Publication Data
US 2007/0064537 A1 Mar. 22, 2007

Related U.S. Application Data

(60) Provisional application No. 60/677,522, filed on May 4, 2005.

(51) Int. Cl.
*G01S 15/60* (2006.01)
(52) U.S. Cl. .................................................. 367/89
(58) Field of Classification Search .................. 367/89, 367/100, 118, 124, 129, 91; 702/143; 73/597
See application file for complete search history.

(56) References Cited

U.S. PATENT DOCUMENTS

| | | | | |
|---|---|---|---|---|
| 3,617,995 A * | 11/1971 | Goulet | | 367/91 |
| 4,244,026 A * | 1/1981 | Dickey, Jr. | | 702/143 |
| 4,964,086 A * | 10/1990 | O'Connell et al. | | 367/38 |
| 5,058,594 A * | 10/1991 | Lazenby | | 600/454 |
| 5,315,562 A * | 5/1994 | Bradley et al. | | 367/89 |
| 5,420,592 A * | 5/1995 | Johnson | | 342/357.12 |
| 5,422,860 A * | 6/1995 | Bradley et al. | | 367/89 |
| 7,133,327 B2 * | 11/2006 | Zhu et al. | | 367/91 |
| 7,295,492 B2 * | 11/2007 | Scoca et al. | | 367/89 |
| 2007/0064537 A1 * | 3/2007 | Huber et al. | | 367/89 |
| 2008/0273423 A1 * | 11/2008 | Scoca et al. | | 367/89 |

OTHER PUBLICATIONS

Galloway, et al., "Tracking the Motion of Sea Ice by Correlation Sonar", Journal of Atmospheric and Oceanic Technology, vol. 14, Jun. 1997, pp. 616-629.*

* cited by examiner

*Primary Examiner*—Dan Pihulic
(74) *Attorney, Agent, or Firm*—DeMont & Breyer LLC

(57) ABSTRACT

A method of estimating velocity with a correlation SONAR that provides improved velocity estimate due to a reduction in random and bias errors is disclosed. The method generates a velocity estimate based on a weighted average of pulse-pairs that includes processing of those pulse-pairs based on an optimal correlation time as well as pulse-pairs based on sub-optimal correlation times.

16 Claims, 6 Drawing Sheets

METHOD FOR IMPROVED SONAR VELOCITY PROCESSING

Statement of Related Cases

This case claims priority of U.S. Provisional Patent Application 60/677,522, filed May 4, 2005, which is incorporated by reference herein. In addition, U.S. Provisional Patent Application 60/690,881, filed Jun. 15, 2005, and U.S. patent application Ser. No. 11/327,702, filed Jan. 6, 2006, are incorporated by reference herein.

FIELD OF THE INVENTION

The present invention relates to velocity measurement systems.

BACKGROUND OF THE INVENTION

There are a number of benefits to being able to accurately estimate the velocity of a sea-faring vessel. One is that an accurate estimation of velocity results in improved estimates of ship's position when using dead-reckoning navigation, such as for submerged vehicles (e.g., submarines, AUVs, UUVs, etc.). This is particularly important when a submerged vehicle is unable to obtain Global Positioning System (GPS) fix information, such as when the vessel must maintain covert status. Another benefit of accurate velocity estimation is that it improves the accuracy of certain on-board missile-delivery systems that require an initial velocity as part of an initialization data set provided to the missile before launch (i.e., for the reduction of missile Circular Error Probable (CEP)).

Correlation SONAR technology is widely-used to estimate velocity. See, for example, U.S. Pat. No. 4,244,026 to Dickey and U.S. Pat. No. 5,315,562 to Bradley et al. These systems typically include a sonar source and a receiver array (i.e., hydrophone array). The positions of the receivers within the array are fixed and known. The SONAR source directs a series of acoustic pulses towards the ocean floor, and the receivers detect echoes of those pulses. The velocity of the vessel is then calculated based upon the best correlated pair of receivers within the array and/or the best correlated pulses detected by the receiver array.

Correlation SONAR systems can be water or ground referenced, and spatial-or temporal-based. A water-referenced correlation SONAR uses echoes reflected from the water beneath a vessel, whereas a ground-referenced correlation SONAR uses echoes reflected from the ocean bottom. A correlation SONAR can also be both ground and water based in the sense of having both ground- and water-referenced modes of operation.

Correlation SONARS rely on selecting a best or maximum correlation between hydrophones and/or pulses, for an estimation of velocity. Maximum correlation occurs when the ray path of an initial SONAR transmission (from the transmitter to the ocean floor, etc., and back to a receiver) of a first detected pulse is equal to the ray path of a second SONAR transmission.

Spatial-correlation SONAR estimates the velocity of a vessel by transmitting two or more pulses towards the ocean bottom, detecting echoes of the pulses on a planar two-dimensional array of hydrophones, determining which two hydrophones in the array correlate the best, and dividing the distance between those hydrophones by twice the time differential between the pulses. The time differential between the detected pulses for which maximum correlation occurs is referred to as the "optimal-correlation time," $CT_o$. In some cases, no two hydrophones will have a spacing that results in a maximum correlation. For example, peak correlation may occur between two hydrophone locations. In this case, an interpolation scheme is used as a part of the velocity estimation. Interpolation, however, reduces the accuracy of the velocity estimate.

Temporal-correlation SONAR also estimates the velocity of a vessel by transmitting two or more pulses toward the ocean bottom and detecting echoes of the pulses at a hydrophone array. For a given pair of hydrophones, the temporal system determines which two pulses correlate the best, and calculates velocity by dividing the fixed distance between the hydrophones by twice the time differential between the two correlated pulses.

Velocity estimates from correlation SONAR are subject to a variety of different random errors and bias errors. To the extent that these types of errors can be reduced, the accuracy of the velocity estimates will improve. Correlation SONARS also have integrity issues in which serious performance degradation can occur in the event that there is an undetected failure in a hydrophone or hydrophone channel and the SONAR uses the faulty channel data for its velocity solution. The phrase "hydrophone channel" means the hydrophone itself, as well as the connectors and cabling to channel electronics, the electronics, and associated data-processing components.

SUMMARY OF THE INVENTION

In prior-art correlation SONAR systems, velocity estimates are determined by processing pulse-pairs that are separated by only the optimal-correlation time. As a result, the number of pulse-pairs processed is limited to a fixed, maximum number of pulse-pairs available for processing. This number is determined by the relationship of the optimal-correlation time and the number of pulses and pulse spacings included in the pulse train transmitted by the SONAR system.

The present invention provides a correlation SONAR that generates a velocity estimate with improved accuracy. The improvement in accuracy is achieved by determining a velocity estimate based on all "available pulse-pairs." The "available pulse-pairs" include those characterized by the ship speed-dependent optimal-correlation time as well as pulse-pairs characterized by other correlation times.

There are many sources of error in a velocity estimate provided by a practical SONAR system, such as:
  Hydrophone interpolation error.
  Error due to the non-homogeneity of the ocean environment.
  Imperfect matching of maximum correlation between fixed-location hydrophones.
  Differences in the amplitude, phase responses, acoustic center drift, and beam patterns of hydrophones (sources of random and bias errors).
  Differences in physical location and orientation of individual hydrophones, as well as array flexure and vibration issues (major sources of bias errors).
  Uncalibrated outboard effects between hydrophone channels, such as those involving cabling, connectorization, and channel integrity issues that affect echo signal and/or noise (sources of random and bias errors).
  Ambient noise differences in the ocean and in the vicinity of the ship (the noise field) as well as in the different hydrophone channel electronics (a source of random errors).

The inventors recognized that there is an advantage to processing as many pulse-pairs as possible, not just those pulse-pairs characterized by the optimal-correlation time. In other words, the inventors recognized that velocity estimation can be improved by processing pulse-pairs characterized by "sub-optimal" correlation times in addition to those pulse-pairs characterized by the optimal-correlation time. A weighting methodology is applied to all processed pulse-pairs, to develop an SONAR-cycle velocity estimate that is a weighted average of all processed pairs. As a result, the SONAR-cycle velocity estimate is improved by a reduction of the random velocity estimate error.

In some embodiments, the present invention determines weighting factors using direct calculation. In some embodiments, weighting factors are determined using well-known models such as the Kalman filter mechanism.

A method for a velocity-measuring correlation SONAR in accordance with the illustrative embodiment of the present invention comprises developing a first estimate of vessel velocity based on a hydrophone pair characterized by an optimal-correlation time. The method further comprises developing additional estimates of vessel velocity based on hydrophone pairs correlated using sub-optimal-correlation times, and calculating an improved estimate of vessel velocity based on a weighted average of all hydrophone-pair-based velocity estimates.

DETAILED DESCRIPTION

Figure 1:
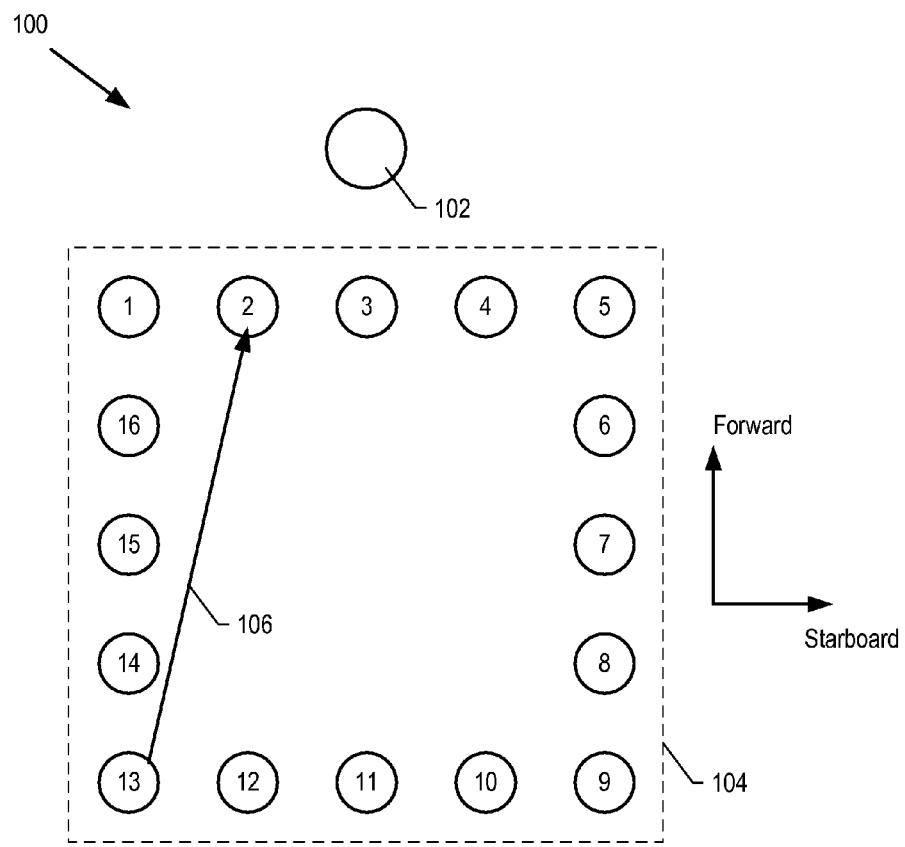
FIG. 1 depicts a schematic of a prior-art velocity-measuring correlation SONAR system.

FIG. 1 depicts a schematic of a prior-art velocity-measuring correlation SONAR system. SONAR system 100, which may be mounted on the underside of a ship, comprises transmitter 102 and receiver array 104. Receiver array 104 comprises receivers or hydrophones 1 through 16 (the terms "receiver" and "hydrophone" are used interchangeably herein). Receiver pair 106, which comprises receivers 13 and 2, is the "best-correlated receiver pair" in receiver array 104, as will be described below and with respect to FIG. 3.

The particular arrangement depicted as array 104 is the Trident SSBN Navigation Sonar System sixteen-hydrophone box array, and is mounted to the underside of a ship that is traveling in a generally-forward direction as defined by FIG. 1.

Figure 2A:
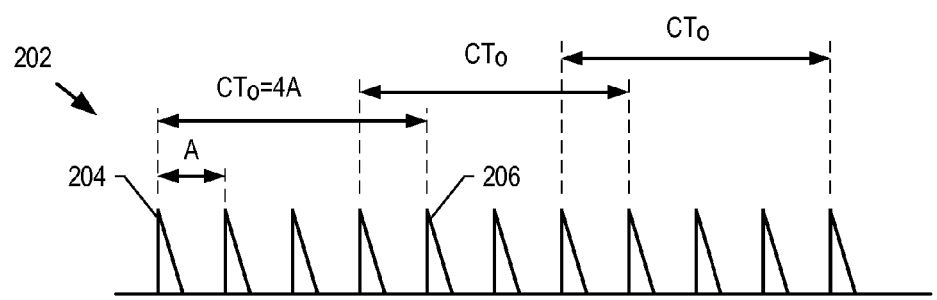
FIG. 2A depicts correlated pulses detected by a best-correlated receiver pair of a receiver array and processed by a limited processing speed processor, according to the prior art.

FIG. 2A depicts correlated pulses detected by a best-correlated receiver pair of a receiver array and processed by a limited processing speed processor, according to the prior art.

Detected pulse train 202 comprises echoes detected by best-correlated receiver pair 106 of receiver array 104. Detected pulse train 202 has equal pulse spacing, A, as transmitted by transmitter 102. Detected echo pulses 204 and 206 exhibit the best pulse-pair correlation between detected pulses at all receiver pairs in receiver array 104, as will be described below, and with respect to FIG. 3. The time between pulses 204 and 206 defines the optimal-correlation time, 4A. A SONAR pulse-pair velocity estimate is then made based on the separation between the receivers exhibiting the best correlation and the optimal correlation time.

The standard deviation of velocity error for a single SONAR pulse-pair velocity estimate is given by:

$$\sigma = \left(\frac{1}{\sqrt{N}}\right)\left(\frac{1}{CT}\right)(K)\left(\frac{\gamma}{\phi}\right)\left(1 + \frac{PN}{PS}\right), \quad (1)$$

where N is the number of data points used to perform the correlation of the pulse-pairs, CT is the correlation time, K is a constant that is representative of a constant velocity error that is associated with all pulse pairs, $\gamma$ is the wavelength of the acoustic signal, $\phi$ is the angular composite transmit/receive beam width, and PN/PS is the noise-to-signal power ratio. The error in a prior-art SONAR pulse-pair velocity estimate, therefore, is inversely proportional to the correlation time. The standard deviation of velocity error for a SONAR pulse-pair velocity estimate based on the optimal correlation time, $CT_o$, is designated herein as $\sigma_{CTO}$.

The accuracy of a SONAR-cycle velocity estimate is improved by averaging multiple pulse-pair velocity estimates made within that SONAR-cycle. The mean-square velocity estimation error is given by:

$$e = \frac{1}{(1/\sigma_1^2) + (1/\sigma_2^2) + \ldots + (1/\sigma_n^2)}, \quad (2)$$

where n is the total number of SONAR pulse-pair velocity estimates. In a processor-speed-limited case, the number of pulse-pairs that can be processed to develop SONAR pulse-pair velocity estimates is limited. FIG. 2A depicts the current state-of-the-art, wherein the number of pulse-pairs processed is limited to three. Since these estimates are based on the optimal correlation time, the mean-square velocity estimation error for each of the three estimates is $\sigma_{CTO}$.

Figure 2B:
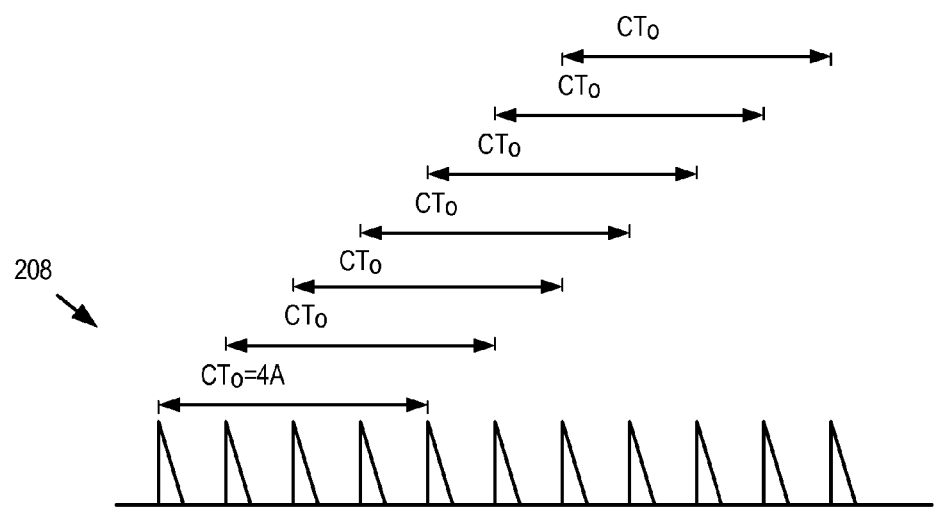
FIG. 2B depicts correlated pulses detected by a best-correlated receiver pair of a receiver array and processed by a high-speed processor, according to the prior art.

FIG. 2B depicts correlated pulses detected by a best-correlated receiver pair of a receiver array and processed by a high-speed processor, according to the prior art. Detected pulse train 208 comprises the echoes detected by best-correlated receiver pair 106. Detected pulse train 208 has equal pulse spacing, A, as transmitted by transmitter 102. The prior art example shown in FIG. 2B depicts the application of prior-art methods, wherein sufficient processing speed is available to process all pulse-pairs characterized by the optimal correlation time, $CT_o$.

The improved processor speed for the case depicted in FIG. 2B yields an improvement in the accuracy of the prior-art SONAR-cycle velocity estimate from that depicted in FIG. 2A. The improvement arises from the availability of more pulse-pair velocity estimates for averaging into the SONAR-cycle velocity estimate. The ultimate limit for the number of pulse-pair velocity estimates, however, is given by the total number of number of pulses transmitted per SONAR cycle, (in this example, 11) less the number of pulse periods in the correlation time, CT (in this example, 4).

For the prior-art example shown here, therefore, the maximum improvement due to improved processor speed is a reduction by a factor of only $\sqrt{7/3}$.

Figure 3:
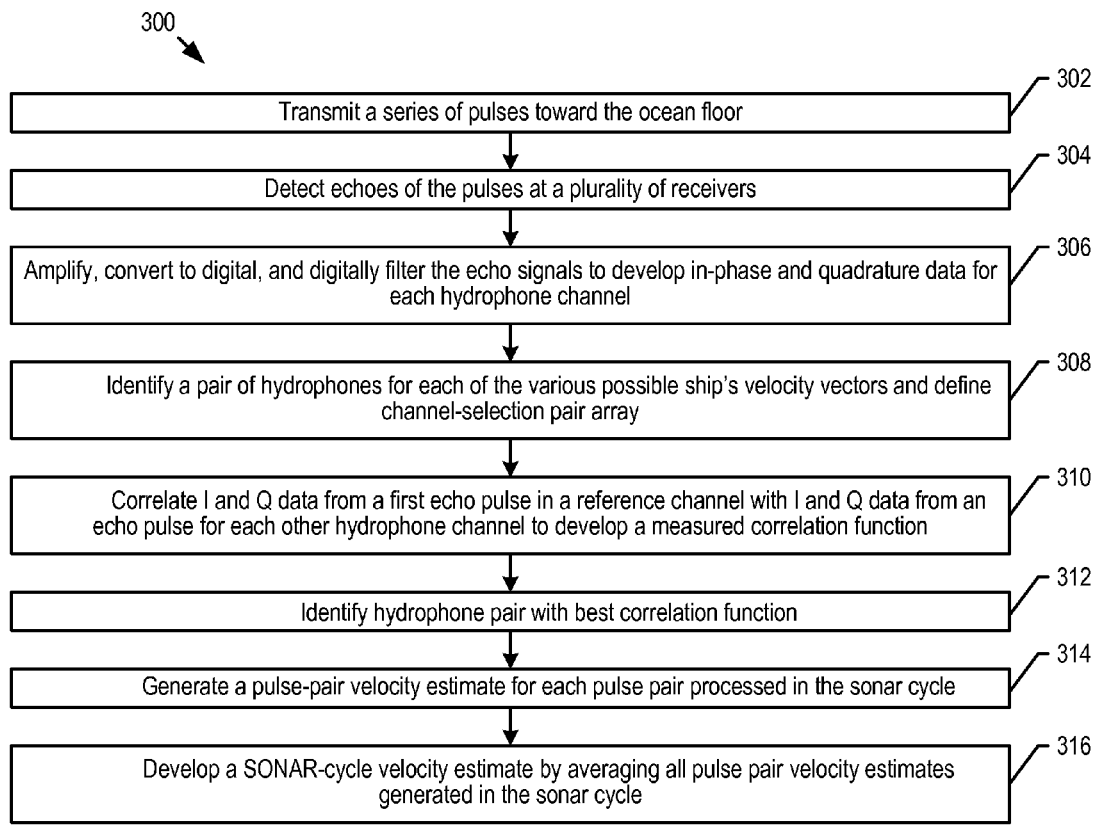
FIG. 3 depicts prior-art method 300 for a velocity-estimating, spatial-correlation SONAR.

FIG. 3 depicts prior-art method 300 for a velocity-estimating, spatial-correlation SONAR.

In accordance with operation 302 of prior-art method 300, a series of pulses are transmitted vertically towards the ocean bottom. In the example depicted in FIGS. 1 through 3, the pulses are transmitted with equal pulse spacing, A. In some other prior art cases, the pulses are transmitted with multiple pulse spacings, A and B, to avoid pulse location ambiguities. In operation 304, echoes are detected at each hydrophone 1 through 16 of hydrophone array 104. In some cases, not all of hydrophones 1 through 16 are normally active. Instead, some hydrophones are reserved as backups. For a ground-referenced correlation SONAR, the echoes are returned from the ocean floor. For a water-referenced correlation SONAR, the echoes are returned from the water volume beneath the ship.

At operation 306, pulse echo data is amplified, converted to digital, and then digitally filtered to yield in-phase ("I") and quadrature ("Q") data for each hydrophone channel. This I and Q data contains all of the amplitude and phase information contained in the echo pulses, but is base-banded and thus vastly reduced in data rate from the A/D converted echo signals.

At operation 308, a pair of hydrophones is identified for each of the various possible ships' velocity vectors, given the arrangement of receiver array 104. A channel-selection pair array, which includes all of the possible non-redundant ship's velocity vectors, is created.

At operation 310, I and Q data from a first echo pulse in a reference channel is correlated with I and Q data from a second (later) echo pulse for each of the other channels. These calculations will form a measured correlation function.

At operation 312, receiver pair 13, 2 is identified as having the best correlation (i.e., receiver pair 13, 2, is "the best-correlated receiver pair"), based on the correlation of I and Q data from echo pulse 204 and echo pulse 206. The time between the detection of detected echo pulses 204 and 206 is the "optimal-correlation time," as defined above. As depicted in FIG. 2, in this example the optimal-correlation time is equal to 4A.

In accordance with operation 314, a pulse-pair velocity estimate is made based on echo pulses 204 and 206 by dividing the distance between hydrophones 13 and 2 by twice the time differential between echo pulses 204 and 206. Operation 314 continues with the development of a pulse-pair velocity estimate for each available pulse-pair in the sonar cycle. The number of pulse-pairs that can be processed is determined by available processor speed. In the example shown in FIG. 2A, processor speed limits the number of processed pulse-pairs to three.

As mentioned above, in general the correlation peak lies between receiver pairs. In these instances, an interpolation algorithm is used to define different spacing and orientation between the receivers. The interpolation provides "correlation distances" in the forward and athwart ship's directions, and the velocity is estimated by dividing the correlation distances by twice the optimal-correlation time, 4A.

At operation 316, an SONAR-cycle velocity estimate for the given SONAR cycle is developed based on an average of all pulse-pair-based velocity estimates of that SONAR cycle.

Figure 4:
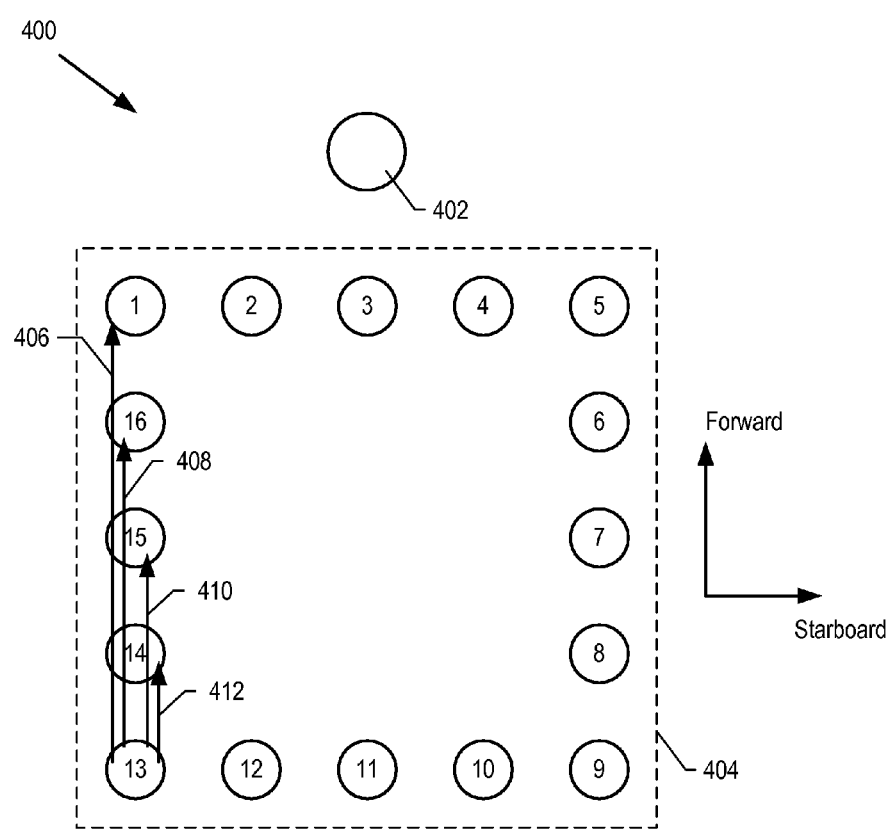
FIG. 4 depicts a schematic of a velocity-estimating correlation SONAR system according to an illustrative embodiment of the present invention.

FIG. 4 depicts a schematic of a velocity-estimating correlation SONAR system according to an illustrative embodiment of the present invention. SONAR system 400, which may be mounted on the underside of a ship, comprises transmitter 402 and receiver array 404. Receiver array 404 comprises receivers or hydrophones 1 through 16. In the example demonstrated by the illustrative embodiment, the vessel is traveling in a direction substantially aligned with the forward direction as denoted in FIG. 4. Receiver pair 406, which comprises receivers 13 and 1, is "best-correlated receiver pair" in receiver array 404. Best-correlated receiver pair 406 is characterized by the optimal correlation time equal to 4A, as described below and with respect to FIGS. 5A-D.

Figure 5A:
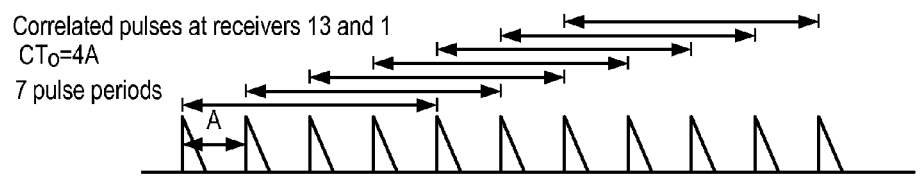
FIG. 5A depicts a graphical representation of SONAR cycle pulse-pairs that are characterized by an optimal correlation time equal to four times a uniform pulse period, as detected at the best-correlated receiver pair.

FIGS. 5A-D depict graphical representations of pulse-pairs in a SONAR cycle using correlation times of 4A, 3A, 2A, and A, respectively. The accuracy of a pulse-pair velocity estimate is proportional to its correlation time and correlation distance. Typically, the optimal correlation time is associated with correlated receiver pairs having the largest physical separation. Since receiver pair 13, 1 has the largest separation along the direction of vessel travel; it is characterized by the optimal correlation time, which in this case is equal to 4A, as depicted in FIG. 5A. Since seven pulse-pairs are correlated, seven SONAR pulse-pair velocity estimates are generated from the pulse-pairs received by receivers 13 and 1. The mean-square estimation error for each of these SONAR pulse-pair velocity estimates is given by equation (1) above as $\sigma_{CTO}$. Other receiver pairs that are aligned with the direction of vessel travel, but with smaller separation, also exhibit some degree of correlation; however they are characterized by sub-optimal correlation times and have different mean-square estimation errors based on their correlation times. The mean-square estimation error of each on n SONAR pulse-pair velocity estimates, $\sigma_i$, based on the sub-optimal correlation time used for that estimate, $CT_i$, wherein i is an integer from 1 to n, can be expressed as a function of $\sigma_{CTO}$ as:

$$\sigma_i = \frac{CT_o}{CT_i} \times \sigma_{CTO}. \tag{3}$$

Figure 5B:
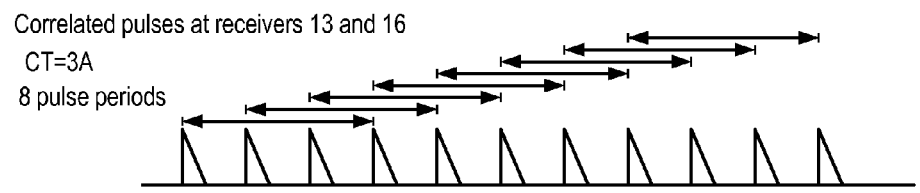
FIG. 5B depicts a graphical representation of SONAR cycle pulse-pairs that are characterized by a sub-optimal correlation time of three times a uniform pulse period, as detected at an associated receiver pair.

FIG. 5B depicts a graphical representation of SONAR cycle pulse-pairs that are characterized by a sub-optimal correlation time of three times a uniform pulse period, as detected at an associated receiver pair. The pulse-pairs are correlated with a correlation time of 3A at associated receiver pair 408, which comprises receivers 13 and 16, According to equation (3), therefore, $\sigma_2$, the mean-square estimation error of each SONAR pulse-pair velocity estimate based on the pulse-pairs shown in FIG. 5B, is equal to 1.33 $\sigma_{CTO}$.

Figure 5C:
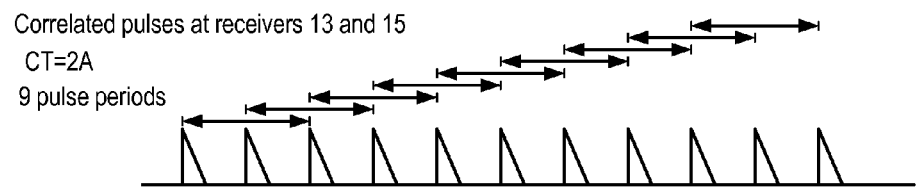
FIG. 5C depicts a graphical representation of SONAR cycle pulse-pairs that are characterized by a sub-optimal correlation time of two times a uniform pulse period, as detected at an associated receiver pair.

FIG. 5C depicts a graphical representation of SONAR cycle pulse-pairs that are characterized by a sub-optimal correlation time of two times a uniform pulse period, as detected at an associated receiver pair. The pulse-pairs are correlated with a correlation time of 2A at associated receiver pair 410, which comprises receivers 13 and 15, According to equation (3), therefore, $\sigma_3$, the mean-square estimation error of each SONAR pulse-pair velocity estimate based on the pulse-pairs shown in FIG. 5C, is equal to $2\sigma_{CTO}$.

Figure 5D:
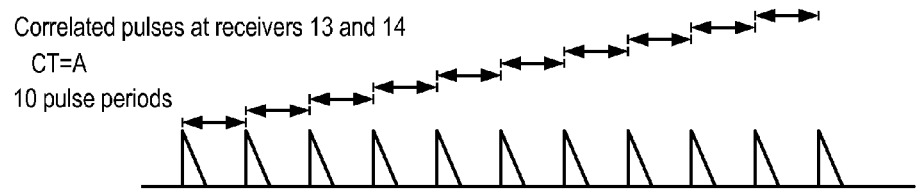
FIG. 5D depicts a graphical representation of SONAR cycle pulse-pairs that are characterized by a sub-optimal correlation time equal to a uniform pulse period, as detected at an associated receiver pair.

FIG. 5D depicts a graphical representation of SONAR cycle pulse-pairs that are characterized by a sub-optimal correlation time equal to a uniform pulse period, as detected at an associated receiver pair. The pulse-pairs are correlated with a correlation time of A at associated receiver pair 412, which comprises receivers 13 and 14, According to equation (3), therefore, $\sigma_4$, the mean-square estimation error of each SONAR pulse-pair velocity estimate based on the pulse-pairs shown in FIG. 5D, is equal to $4\sigma_{CTO}$.

In the prior art, an SONAR-cycle velocity estimate is generated, which is based on an average of equally-weighted pulse-pair velocity estimates, which are based on only the optimal correlation time. In contrast to the prior art, the present invention develops an SONAR-cycle velocity estimate based on a weighted average of all available pulse-pair measurements in a SONAR cycle—including those velocity estimates based on optimal and sub-optimal correlation times.

A weighted average of velocity estimates is used in order to obtain an improved estimate of velocity from data provided by the receiver array by reducing the contribution of the errors inherent to the noisy environment that the receiver array represents. Stochastic models designed to obtain "optimal" estimates of a desired quantity from data provided by a noisy environment are well-known. One example of such a stochastic model is the Kalman filter, which is a recursive data processing algorithm. Heretofore, however, stochastic models have not been applied to SONAR technology as disclosed in this specification.

A SONAR-cycle velocity estimate generated according to the present invention is a weighted average of a plurality of SONAR pulse-pair velocity estimates, where the weighted average SONAR-cycle velocity estimate, $X_{SC}$, of n SONAR pulse-pair velocity estimates in the SONAR cycle is computed as:

$$X_{SC} = a_1 * x_1 + a_2 * x_2 + \ldots + a_n * x_n. \quad (4)$$

Weighting coefficients, $a_i$, are based on the mean-square velocity estimation error, $\sigma_i$, for each SONAR pulse-pair velocity estimate, $x_i$, where i is a number from 1 to n, and are given by:

$$a_i = \frac{1/\sigma_i^2}{(1/\sigma_1^2) + (1/\sigma_2^2) + \ldots + (1/\sigma_n^2)}. \quad (5)$$

According to the method disclosed herein and using equations (2) and (3), the mean-square velocity estimation error for a SONAR-cycle velocity estimate made using a weighted average of SONAR pulse-pair velocity estimates can be expressed as:

$$e = \frac{1}{\left(\frac{1}{\left(\frac{CT_o}{CT_1}\right)\sigma_{CTO}}\right)^2 + \ldots + \left(\frac{1}{\left(\frac{CT_o}{CT_i}\right)\sigma_{CTO}}\right)^2 + \ldots + \left(\frac{1}{\left(\frac{CT_o}{CT_n}\right)\sigma_{CTO}}\right)^2}, \quad (6)$$

Where $CT_1$ is equal to $CT_o$.

An improvement in the accuracy of a velocity estimate is achieved by the method disclosed in this specification. For example, and referring now to FIGS. 2, 4 and 5A-D, and equation (6) above, the mean-square estimation error, e, for the error that results from the method disclosed in this specification is given as:

$$e = \frac{1}{7(1/\sigma_{CTO})^2 + 8(1/1.33\sigma_{CTO})^2 + 9(1/2\sigma_{CTO})^2 + 10(1/4\sigma_{CTO})^2}.$$

A weighted average of SONAR pulse-pair velocity estimates, therefore, yields an improvement in the accuracy of a velocity estimate of at least $(14.4/7)^{1/2}$ over the prior art example depicted in FIG. 2B. This improvement estimate assumes sufficient processing power is available to enable the prior art method to process all 7 available pulse-pairs in the SONAR cycle depicted in FIG. 2B. As compared to a limited processing speed processor-based systems (such as that described above and with respect to FIG. 2A), the method disclosed herein yields an improvement of $(14.4/3)^{1/2}$.

Figure 6:
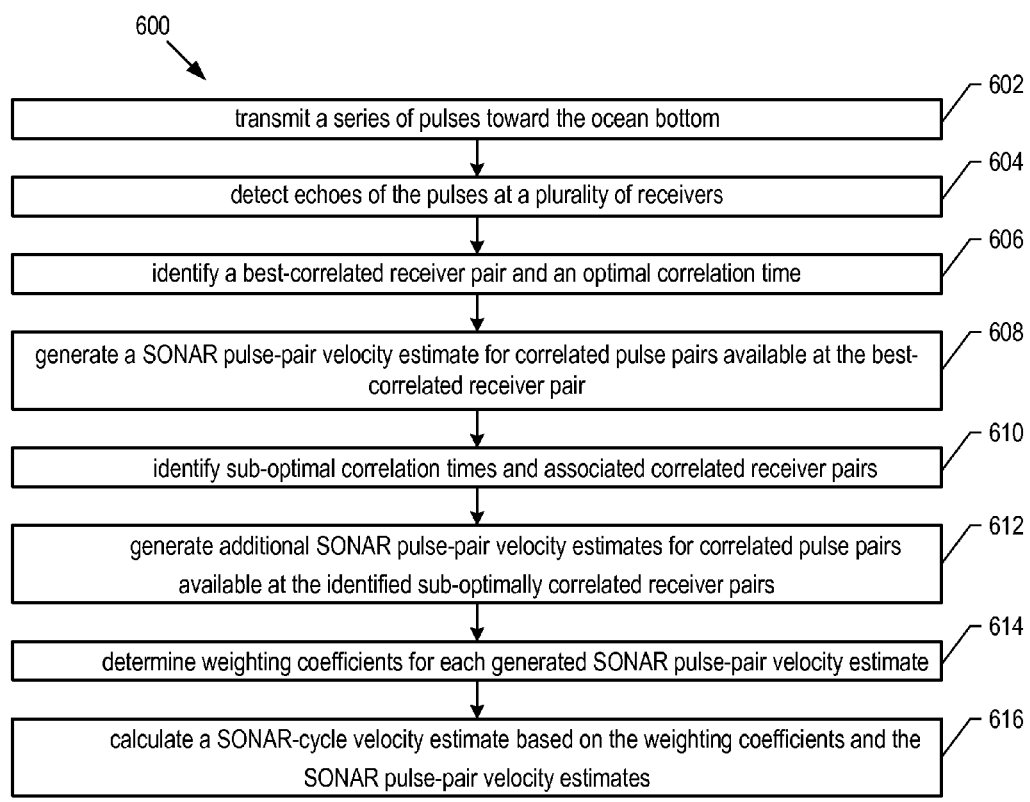
FIG. 6 depicts method 600 for a velocity-estimating, spatial-correlation SONAR, according to the present invention.

FIG. 6 depicts method 600 for a velocity-estimating, spatial-correlation SONAR, according to the present invention.

At operation 602, a series of pulses are transmitted vertically towards the ocean bottom. As in the example depicted in FIGS. 1 through 3, the pulses are transmitted with equal pulse spacing, A. In some other prior art cases, the pulses are transmitted with multiple pulse spacings, A and B, to avoid pulse location ambiguities. In operation 604, echoes of the pulses are detected at each hydrophone 1 through 16 of hydrophone array 604. In some cases, not all of hydrophones 1 through 16 are normally active. Instead, some hydrophones are reserved as backups. For a ground-referenced correlation SONAR, the echoes are returned from the ocean floor. For a water-referenced correlation SONAR, the echoes are returned from the water volume beneath the ship.

At operation 606, best-correlated receiver pair 406 is identified, as is the optimal correlation time (in this example, 4A).

At operation 608, SONAR pulse-pair velocity estimates are generated based on correlated pulses at the best-correlated receiver pair. These velocity estimates are based on the optimal correlation time, $CT_o$. One velocity estimate is made for each of the seven pulse-pairs correlated. These seven SONAR pulse-pair velocity estimates are made in similar fashion to a SONAR-cycle velocity estimate generated using the prior art method described above and with respect to FIGS. 2B and 3.

At operation 610, available sub-optimal correlation times are identified. The available sub-optimal correlation times are 3A, 2A, and A. Also at operation 610, a receiver pair characterized by each sub-optimal correlation time is identified and selected. For example, receiver pair 408 is identified as being characterized by a correlation time of 3A, receiver pair 410 is identified as being characterized by a correlation time of 2A, and receiver pair 412 is identified as being characterized by a correlation time of A.

At operation 612, additional SONAR pulse-pair velocity estimates are generated. These include 8 estimates based on correlated pulses at receiver pair 408, characterized by a CT of 3A; 9 estimates based on correlated pulses at receiver pair 410, characterized by a CT of 2A; and 10 estimates based on correlated pulses at receiver pair 412, characterized by a CT of A. In some embodiments, a SONAR-cycle velocity estimate includes SONAR pulse-pair velocity estimates from multiple receiver pairs characterized by the same correlation time. For example, multiple receiver pairs in array 404 are characterized by a correlation time of 3A (i.e., 13 and 16; 14 and 1; 9 and 6; and 8 and 5). A SONAR-cycle velocity estimate may, therefore, include the contributions from SONAR pulse-pair velocity estimates based on multiple receiver pairs such as receivers 13 and 16 and:

i. 14, 1; or
ii. 9, 6; or
iii. 8, 5; or
iv. any combination of i, ii, and iii.

At operation 614, weighting coefficients for each SONAR pulse-pair velocity estimate are determined based on equation (5) above. In some alternative embodiments, weighting coefficients are determined by direct calculation. In some alternative embodiments, weighting coefficients are estimated. Although in the illustrative embodiment, weighting coefficients are determined using equation (5), it will be clear to those skilled in the art, after reading this specification, how to make and use alternative embodiments of the present invention that determine weighting coefficients by means other than equation (5).

At operation 616, a weighted SONAR-cycle velocity estimate is calculated based on the calculated weighting coefficients and the pulse-pair velocity estimates determined in operations 608, 612, and 614.

In some embodiments of the present invention, an optimal recursive stochastic filter, such as a Kalman filter, is used to continuously refine the estimated velocity for a vessel.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    generating a first velocity estimate based on a correlation of acoustic pulses received by a first hydrophone pair, wherein said first velocity estimate is based on a first correlation time, and wherein said first correlation time is an optimal-correlation time;
    generating a second velocity estimate based on a correlation of acoustic pulses received by a second hydrophone pair, wherein said second velocity estimate is based on a second correlation time; and
    generating a third velocity estimate that is based on said first velocity estimate and said second velocity estimate.

2. The method of claim 1 wherein said third velocity estimate is based on a weighted average of said first velocity estimate and said second velocity estimate.

3. The method of claim 2 wherein said weighted average comprises weight values determined using direct computation.

4. The method of claim 2 wherein said weighted average comprises weights determined using a stochastic model.

5. The method of claim 4 wherein said stochastic model is based on a Kalman filter.

6. The method of claim 1 further comprising transmitting a pulse train comprising said acoustic pulses toward a reflecting surface, wherein said pulse train has a uniform interval.

7. The method of claim 1 further comprising transmitting a pulse train comprising said acoustic pulses toward a reflecting surface, wherein said pulse train has a non-uniform interval.

8. A method comprising:
    detecting energy pulses at a plurality of receivers;
    determining a correlation value for each of a plurality of receiver pairs within said plurality of receivers, wherein said correlation value is based on said detected energy pulses;
    generating a first velocity estimate based on a first receiver pair, wherein said first receiver pair has a first correlation that is the maximum correlation among said plurality of receiver pairs;
    generating a second velocity estimate based on a second receiver pair, wherein said second receiver pair has a second correlation value;
    generating a third velocity estimate based on said first velocity estimate and said second velocity estimate.

9. The method of claim 8 wherein said first velocity estimate is based on the physical separation of said first receiver pair, and wherein said second velocity estimate is based on the physical separation of said second receiver pair.

10. The method of claim 8 wherein said third velocity estimate is based on a weighted average of said first velocity estimate and said second velocity estimate.

11. The method of claim 10 wherein said weighted average comprises weight values determined using direct computation.

12. The method of claim 10 wherein said weighted average comprises weights determined using a stochastic model.

13. The method of claim 12 wherein said stochastic model comprises a recursive filter.

14. The method of claim 12 wherein said stochastic model comprises a Kalman filter.

15. The method of claim 8 further comprising transmitting a pulse train comprising said energy pulses toward a reflecting surface, wherein said pulse train has a uniform interval.

16. The method of claim 8 further comprising transmitting a pulse train comprising said energy pulses toward a reflecting surface, wherein said pulse train has a non-uniform interval.

* * * * *